March 27, 1934. G. B. SHANKLIN 1,952,097
STOP JOINT FOR ELECTRIC CABLES
Filed May 20, 1932
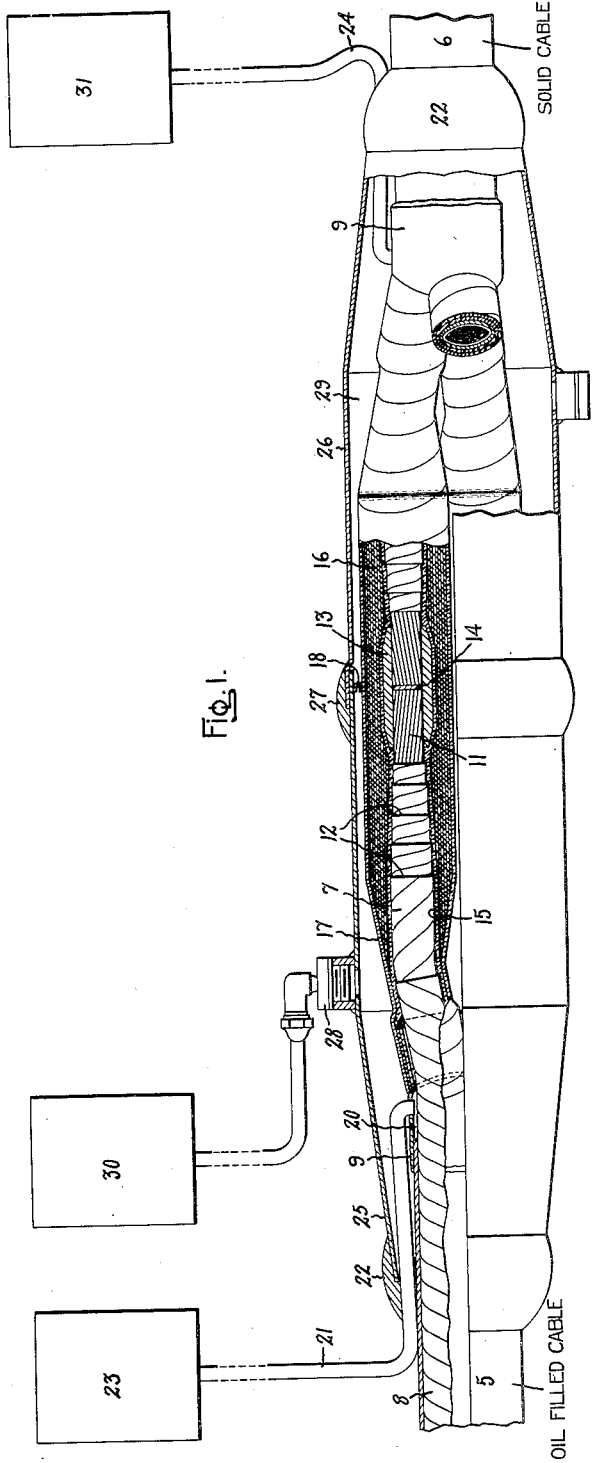
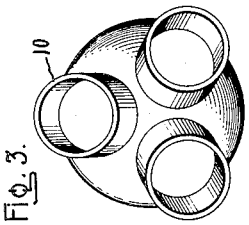
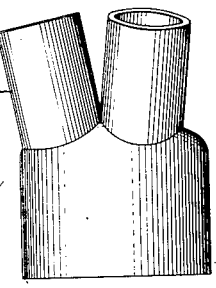
Inventor:
George B. Shanklin,
by Charles E. Mullen
His Attorney.

Patented Mar. 27, 1934

1,952,097

UNITED STATES PATENT OFFICE 1,952,097

STOP JOINT FOR ELECTRIC CABLES

George B. Shanklin, Schenectady, N. Y., assignor to General Electric Company, a corporation of New York Application May 20, 1932, Serial No. 612,546

12 Claims. (Cl. 173—268)

The present invention relates to stop joints for preventing the passage of insulating fluid from one section or length of an electric cable to another, and this whether the cable be of the solid or fluid filled type or a combination of the two. The invention is particularly directed to power cables conveying electric currents of relatively high potential, but is not necessarily limited thereto.

Heretofore stop joints have only been used with so-called fluid filled cables, meaning thereby a cable having a channel containing freely flowing liquid insulation, and then only where necessary to limit the hydrostatic head of the liquid. Because of their size and cost, the practice is to use as few stop joints as possible in a given installation. Moreover, due to the length of these joints, special manholes usually have to be constructed which substantially increases the cost of installation. There is a pressing demand for a simpler and cheaper stop joint and one which can be used without incurring the expense of special manholes. There are also many instances where stop joints should be used in solid type cable systems, but are not because of cost considerations. For example, on steep grades and for vertical risers in power stations where the migration of filling compounds from pot heads and other devices has proved a source of trouble.

The object of my invention is the provision of an improved and simplified type of stop joint which may be used with equal facility with fluid filled cables, solid cables, combined fluid and solid type cables, etc. By reason of my improvements as hereinafter set forth, the length of the joint is so reduced that it may be installed in a relatively small manhole. Further, the use of large and expensive parts is avoided, thereby greatly reducing the cost of the joint as a whole. Moreover, in its construction only such parts are employed as may conveniently be used for various sizes and types of joints and stocked by the cable operating companies.

Briefly stated, in carrying out my invention, means are employed definitely to prevent the passage or migration of the impregnating fluid through the strand spaces in one conductor to the strand spaces of the other conductor jointed thereto. This may conveniently be done by the use of a solder seal between conductor ends and located inside of the connector uniting the cable ends. The ends of the sheath inside of the joint casing are provided with sealing caps, and over the adjacent ends of the caps and over the insulation on the conductors between the caps and the connector is applied an insulating covering which is impervious to the oil or compound used in impregnating the insulation of the cables and which is also impervious to the oil or other fluid used to fill the joint enclosing casing, the latter being sealed to the sheaths beyond or outside of the sealing caps. For this purpose, I may, for example, use very thin varnished silk in the form of narrow strips or tape or alkyd resin tape either alone or in combination. The tapes should be so applied as to closely adhere to the factory applied insulation on the conductors, to each other and to the metal parts covered thereby. The tape is so applied that longitudinal migration of the impregnating fluid of each cable length beyond the cut end of the insulation is prevented. Also radial movement of the fluid from any cause is limited to the factory applied insulation on each of the individual conductors.

For a consideration of what I believe to be novel and my invention, attention is directed to the accompanying description and the claims appended thereto.

In the drawing Fig. 1 illustrates one embodiment of my invention wherein is shown principally in longitudinal section a stop joint for connecting a three conductor fluid filled cable to a three conductor solid cable; Figs. 2 and 3 are respectively side and end views of a sealing cap, and Fig. 4 is a perspective view of a piece of impervious insulating tape.

I have elected to illustrate my invention in connection with a joint employed to unite the three conductors of a fluid filled cable with a corresponding number of conductors of a solid type cable because in such combination it is important, among other things, to prevent the impregnating fluid of the solid cable from contaminating the different and usually lighter fluid of the other cable, and because in such a joint most, if not all, of the joint making problems are presented.

5 indicates the sheath of a section of three conductor fluid filled cable and 6 the sheath of a section of three conductor solid type cable. In the cable 5 the oil channel may be located in one or more of the so-called filler spaces, the particular arrangement being immaterial, so far as the joint is concerned. The conductors of these cables are stranded, insulated with pervious material and shielded in accordance with the usual practice. As is customary I use a thin degasified oil for impregnating the fluid filled cable and a heavier fluid such as petrolatum for the solid type cable, both of which are hereinafter referred to as fluids. 7 indicates the pervious paper insulation and 8 an electrostatic shield wrapped around the paper. All of the conductors are individually so covered. The shields have numerous small openings or perforations therein to permit fluid to freely pass from one side thereof to the other.

Because the joints between the several conductors are similar, a description of one of them is sufficient. To the end of sheath 5 is soldered a sealing cap 9 made of thin sheet metal as copper, for example, and having as many sleeves 10 as there are conductors. The joint between the cap and sheath is made fluid tight as by soldering. The sleeves are purposely made of considerable length as compared to their diameters so as to afford a surface area of considerable extent to receive the impervious insulating tape which is relied upon to seal the joint between the sleeve and the conductor covering. For most installations a sealing cap should be provided for each conductor length or section, but where it is satisfactory to permit the fluid in the joint enclosing casing to interchange with that in one only of the cable lengths, only one such cap may be used. The paper insulation on the stranded conductor 11 is reduced in thickness step-by-step forming shoulders 12. With paper or any other pervious wrapping on the conductor the impregnating fluid will fill the spaces between strands and will also move by capillary action both radially and longitudinally to fully impregnate the paper. Unless means are provided to stop it, the fluid of one section will migrate from one section to another through the paper and especially through the strand spaces of the conductors. At this point it may be stated that the chief requirement of a true stop joint is that it shall prevent the movement of all fluid from one cable length to another, since if only a very small constant leakage occurs, it will ultimately cause trouble by building up an excessive pressure on the low side.

Having prepared both ends of the conductors to be united by stripping back the sheath and stepping the insulation, the stranded conductors are united by a connector 13. The connector is soldered to the conductors and in addition the spaces between strands are also filled with solder as fully as possible. Because it cannot be determined by inspection whether the strand spaces are filled with solder or not, a seal or dam 14 is provided within the connector and located between the conductor ends, said ends being separated by sufficient space for the purpose. Such a dam can be formed with certainty by heating the parts and feeding sufficient string solder through an opening in the upper side of the connector to fill the space defined by the inner wall of the connector and the ends of the stranded conductor.

After the conductors of a pair are fitted with sealing caps, their ends united by a connector, the seal or dam 14 completed, all excess solder removed and the metal parts made smooth, the next step is to insulate the joint. For this purpose I may use any insulating material which when applied to the aforesaid parts is impervious to the fluid used in the cable and joint, whatever it may be, both in a radial and in a longitudinal direction. Such insulation should cover all of the parts from sealing cap to sealing cap, including the sleeves on the caps so that a complete seal is effected in the regions of the caps as well as elsewhere. For this purpose I may use very thin tapes made of varnished textile material of which silk has the advantages of being strong, hence not easily torn, and being thin will adapt itself to small irregularities of surface. Also because of the kind of varnish used in its manufacture it has great adhesive qualities not only layer to layer but also to metal parts. I also coat or may coat all exposed surfaces with a cement which is likewise impervious to the insulating fluids in the cable parts prior to applying the silk covering. The entire joint covering may be made of silk which on account of its finer weave and strength is generally better than other forms of textile material, but as it is relatively expensive, a suitable thickness of silk may first be applied and over it as a reinforcement enough varnished cambric or other material to complete the joint. I may also for this purpose use tapes made of resinous compounds, as for example, alkyd resin which briefly stated may be made by reacting with a polyhydric alcohol such as glycerine and the polybasic acid such as phthalic anhydride, a dihydric alcohol such as ethylene glycol and a dibasic aliphatic acid such as succinic acid until the desired flexible resin is produced. Such resins may be produced in various degrees of flexibility and in sufficiently thin strips or tape form suitable for wrapping about a cable joint.

A piece of tape suitable for the purpose is shown at 15, Fig. 3. This tape is smoothly and evenly wrapped over the connector, any exposed part of the conductor, the stepped insulation on the conductors and also over the sleeves on the sealing caps. The tape should be so wound that the edges contact as fully as possible to prevent void formation, and the turns of the successive outer layers should cover the joints of the inner layers, i. e., break joint. Between each layer and the next is or may be a cement coating, the character of which depends on the type of tape used to fill any small spaces between turns and also to aid consolidating the same into a homogeneous body.

For cementing varnished silk I may use a form of varnish generally similar to that used in treating the silk and one having only a small percentage of solvent. For alkyd resin tape a cement made of alkyd resin may be used. As the turns are applied under tension, any excess cement will be squeezed out from between the turns. It is also desirable to coat all of the exposed surfaces of insulation and metal with said cement before starting the tape winding operation.

As will be evident from what has been said before, the pervious wrappings or factory applied insulation on the exposed ends of the conductors must be fully covered with the said impervious tape so that there can be no migration of the impregnating fluid of the cable either longitudinally between layers or radially outward through the layers within the joint. The entire insulation over the conductor ends may be of one kind of tape or only a part thereof. As shown, the joint is insulated with one kind of impervious tape, forming the inner part with a second or reinforcement wrapping 16 forming the outer part and made of varnished cambric or equivalent material which is of somewhat lower cost. Outside of the joint insulation whether made of one or more kinds of wrapping is an electrostatic shield 17 made of woven copper tape closely and spirally wrapped in place. Starting at one end the metal tape is closely butt wrapped around the impervious tape wrapping for a suitable distance, in this case approximately one and one-half inches. All of these turns are then lightly soldered together forming in effect a solid band. The bands at both ends of the joint are soldered to the sealing caps and the latter of course are soldered to the sheaths, thus an electrical connection is made from sheath to sheath. It is also desirable to ground the shield to the joint casing by suitable means as indicated at 18.

As before stated, the sealing cap surrounds the end of the cable sheath and is soldered and sealed thereto. Between the inner wall of the cap and the conductor coverings are one or more spaces which form a chamber 20 that is filled with insulating fluid from the channel or channels of the cable. As it is necessary at times to permit fluid to flow outwardly as when the cable is heated and to supply fluid to the cable as it cools, a conduit or tube 21 is provided and soldered or brazed to one wall of the cap. The tube passes through and is soldered to one wall of the joint enclosing casing, as by the wiped joint 22, and is connected at its outer end to a suitable reservoir 23 of a variable volume type. This and the other reservoirs to be referred to later are of a type to maintain atmospheric or higher pressure, preferably the latter on the fluids within the cables and joint casing. The solid type cable at the opposite end of the joint is provided with a sealing cap such as previously described and from the chamber of this cap extends a tube 24 for connection to a second reservoir of variable volume 31. The reservoirs may be of usual construction and exert superatmospheric pressure on the fluid.

The joint casing may be of any suitable construction. As shown it comprises two principal parts 25 and 26 which are jointed and soldered at 27. The ends of the casing are sealed to the cable sheaths by wiped soldered joints 22. Prior to starting the jointing operations the casing parts are slipped over the ends of the cable and moved back out of the way. The casing is provided with a fitting 28 by means of which the chamber 29 defined by the wall of the casing is filled with fluid such as oil. Usually the casing will be connected through the fitting with a separate reservoir 30 of variable capacity type which insures complete filling of the casing at all times, or this fitting may be connected to reservoir 23, by-passing the sealing cap at this end.

The construction herein described may be applied to single conductor channel type fluid filled cable or to single conductor solid type cable as will be evident from the fact that each conductor of one cable section is individually jointed to a conductor of another section. The sealing cap in this case will have one sleeve instead of three as shown. I may also utilize some or all of the same principles in making terminals for either fluid filled or solid type cables.

Reference has been made to using certain kinds of impregnating fluids and certain kinds of impervious coverings suitable for use therewith. In the event of using other forms of impregnating fluids the impervious wrappings should be of such character that the fluids do not have a deleterious effect thereon.

I am aware of the application for patent of Lester L. Phillips, Serial No. 476,228, filed August 18, 1930, and make no claim to what is disclosed therein.

What I claim as new and desire to secure by Letters Patent of the United States, is:—

1. A stop joint for electric cables comprising a pair of stranded conductors, each having a covering of permeable insulation and a sheath, said insulation being removed near the conductor ends to expose the strands, fluid insulation impregnating the covering and entering the spaces between strands, means completely sealing the strand spaces at the end of one conductor from those of the other, a connector uniting adjacent ends of the conductors, a sealing cap secured to one of the sheaths and closely surrounding the covering of a conductor, a wrapping of insulation for the connector, the insulated coverings on the conductors adjacent the connector and a portion of the cap, said wrapping being impervious both longitudinally and radially to impregnating fluid, and an enclosing casing having its ends sealed to the sheaths.

2. A stop joint for electric cables comprising a pair of stranded conductors, each having a covering of permeable insulation and a sheath, said insulation being removed near the conductor ends to expose the strands, fluid insulation impregnating the coverings and entering the spaces between strands, means completely sealing the strand spaces at the ends of the conductors one from the other, a connector uniting adjacent ends of the conductors, a metal sealing cap secured to one of the sheaths and closely surrounding the covering of a conductor, a wrapping for the connector, the insulated coverings on the conductors adjacent the connector and the cap, comprising numerous turns of tightly applied thin varnished silk, an enclosing casing having its ends sealed to the sheath, and a filling of insulating fluid for the casing.

3. A stop joint for electric cables comprising a pair of stranded conductors, each having a sheath, a covering of permeable insulation, said insulation decreasing in thickness toward the ends to expose the strands, fluid insulation impregnating the coverings and entering the spaces between the strands, a channel within one of the sheaths for fluid insulation, a metal sealing cap secured at one end to the sheath containing the channel and at the other end snugly fitting a conductor covering, said cap and conductor covering defining a fluid containing chamber, means sealing the strand spaces at the ends of the conductors, a connector for uniting the conductor ends, a wrapping of insulation for a portion of the cap, the conductor coverings and the connector, said wrapping being impervious both longitudinally and radially to the impregnating fluid, an enclosing casing sealed at its ends to the sheath, and a conduit extending outwardly through the casing and communicating at its inner end with the chamber within the cap.

4. A stop joint for electric cables comprising a pair of stranded conductors, each having a sheath, a covering of permeable insulation, said insulation being removed near the conductor ends to expose the strands, fluid insulation impregnating the coverings and entering the spaces between the strands, metal sealing caps secured one to each of the sheath ends, a sleeve forming a part of each cap and closely surrounding a conductor covering, means sealing the strand spaces near the ends of the conductors, a connector for uniting the conductor ends, a continuous wrapping of insulation covering the sleeves on the caps and also the connector and conductor coverings between sleeves, said wrapping being impervious both longitudinally and radially to the impregnating fluid, a casing sealed at its ends to the sheaths, and a fluid filling for the casing.

5. A stranded conductor having a sheath, a covering of permeable insulation which is gradually reduced in thickness at one end to expose the conductor strands, impregnating fluid within the sheath, a connector secured to an end of the conductor, means inside of the connector for sealing the strand spaces in the conductor, a sealing cap having one end sealed to the sheath and at the other end provided with a sleeve, said sleeve closely surrounding the conductor covering, said cap and conductor covering defining a fluid containing chamber, insulation for the sleeve and conductor covering arranged in concentric layers, said insulation comprising varnished silk, a casing defining a chamber, one end of which is sealed to a sheath, a conduit opening into the chamber defined by the cap and conductor covering, and means for supplying fluid to the chamber of the casing.

6. A stop joint for electric cables comprising a pair of stranded conductors each having a sheath, a covering of permeable insulation, an insulating fluid impregnating the covering which tends to migrate from one conductor to the other, the said covering being reduced in thickness toward the ends of the conductors to expose the conductor ends, a metallic connector uniting the adjacent ends of the conductors, a sealing means located inside of the connector between strands of the conductors to prevent migration of the impregnating fluid, a sealing cap secured to one of the sheaths and closely surrounding the covering of a conductor, insulation applied over the connector, the coverings on the conductors and a portion of the cap, which is impervious, both longitudinally and radially, to said impregnating body, a covering of insulating alkyd resin tape surrounding the impervious insulation, and an enclosing casing which is sealed to the sheaths.

7. A cable joint comprising a pair of stranded conductors, each having a sheath, permeable insulating coverings therefor, which are reduced in thickness toward the ends, a connector for uniting the conductor ends, means inside of the connector for sealing the strand spaces, an insulating wrapping for the connector and insulated conductor ends comprising layers of flexible tape made of alkyd resin, means for securing said wrapping in fluid-tight relationship to said sheaths and an enclosing casing sealed to the sheaths.

8. A cable joint comprising a pair of stranded conductors, each having a sheath, permeable insulating coverings therefor, which are reduced in thickness toward the ends, a connector for uniting the conductor ends, means within the connector for sealing the strand spaces of the conductors, an insulating wrapping for the connector and insulated conductor ends comprising layers of flexible tape made of alkyd resin which are impervious to insulating fluid both longitudinally and radially, means for securing said wrapping in fluid-tight relationship to said sheaths, coatings of cement between layers, and an enclosing casing sealed to the sheaths.

9. In combination, a section of fluid filled cable comprising a stranded conductor, insulation thereon which is permeable to fluid, a sheath and a body of light insulating fluid within the sheath, a section of solid type cable comprising a stranded conductor, insulation thereon which is permeable to fluid, a sheath and a body of relatively heavy insulating fluid which moves slowly under the influence of heat, and a joint for connecting the conductors which comprise means for sealing the strand spaces of both conductors, a connector uniting the conductor ends, a means secured to the sheath of the fluid filled cable for preventing the flow of fluid therefrom, a wrapping of tape for the connector, insulated ends of both cables and said flow preventing means which is impervious to the passage of fluid from one cable to the other both longitudinally and radially, and an enclosing casing which is sealed at its ends to the cable sheaths.

10. A cable joint comprising stranded conductors each having factory applied pervious insulation, a perforated electrostatic shield over the insulation, a connector uniting the ends of the stranded conductors, a means within the connector for sealing the strand spaces of the conductors one from the other, a sealing cap applied to each of the sheaths having a sleeve embracing the shield on its conductor, a covering of insulation impervious to fluid enclosing said sleeves and also the parts situated between them, a reinforcing wrapping over said covering, an electrostatic shield covering the reinforcing wrapping and connected at its ends to the caps, an enclosing casing, a filling of fluid for the casing, means connected to the sealing caps for conveying fluid to and from the cables, and a means for admitting fluid to the enclosing casing.

11. A stranded conductor having a covering of permeable insulation, a sheath therefor, fluid insulation within the sheath for impregnating the insulation, a second conductor, means uniting the conductors and also preventing the passage of impregnating fluid through the strands of the first mentioned conductor, a sealing cap connected fluid tight to the said sheath and having an opening through which the stranded conductor and its insulating covering extends, a wrapping of impervious material covering a portion of the sealing cap and also the insulation on the stranded conductor and the conductor uniting means, a casing for the aforesaid parts, and a fluid filling for the casing.

12. A cable joint comprising a pair of stranded conductors, a permeable insulating covering for each conductor, a sheath for each conductor which is cut back to expose the conductor ends, impregnating fluid for each conductor confined by the sheath thereof, a connector uniting the conductor ends, a sealing cap for each conductor secured fluid tight to the sheath thereof, a wrapping of impervious tape covering the connector, parts of the sealing caps and the conductor coverings between the caps, layers of cement between the turns of the wrapping, and a fluid containing casing enclosing the joint and sealed to the sheaths.

GEORGE B. SHANKLIN.